Dec. 30, 1969   H. HECHENLEITNER   3,486,296
APPARTUS FOR AUTOMATICALLY LOADING ROWS OF RECTANGULAR OR SQUARE
BAGS OR CONTAINERS INTO A COLLECTING RECEIVER, OUTER
CARDBOARD BOX, OR THE LIKE
Filed June 8, 1967                         2 Sheets-Sheet 2
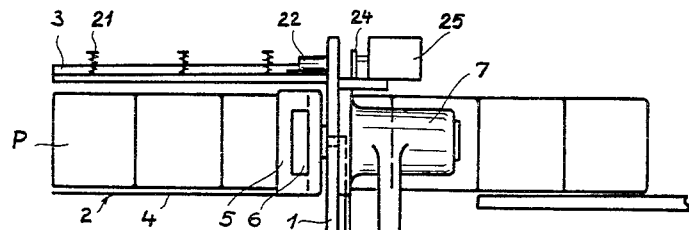
Fig. 3
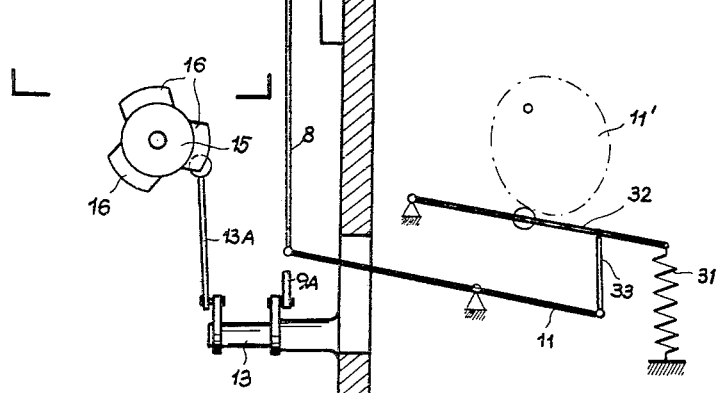
Fig. 4
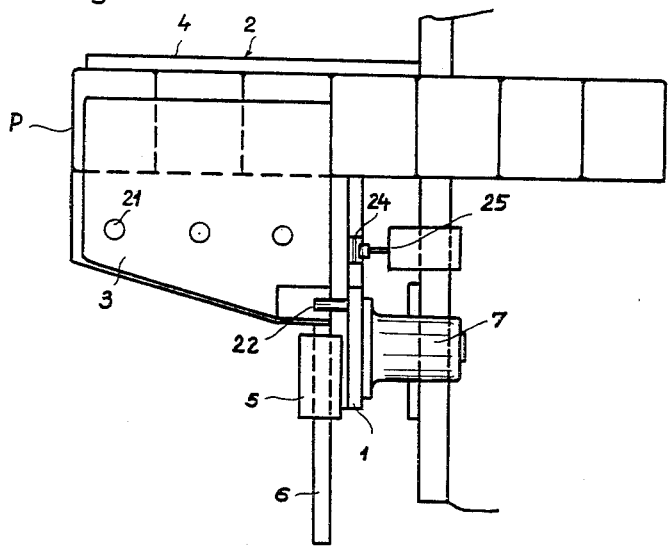
INVENTOR.
Hans Hechenleitner
BY
*attorney*

United States Patent Office 3,486,296
Patented Dec. 30, 1969

3,486,296
APPARATUS FOR AUTOMATICALLY LOADING ROWS OF RECTANGULAR OR SQUARE BAGS OR CONTAINERS INTO A COLLECTING RECEIVER, OUTER CARDBOARD BOX, OR THE LIKE
Hans Hechenleitner, Villach, Austria, assignor to Hechenleitner & Cie, Villach, Austria, a corporation of Austria
Filed June 8, 1967, Ser. No. 644,618
Claims priority, application Austria, June 16, 1966, A 5,787/66
Int. Cl. B65b 35/36, 43/56
U.S. Cl. 53—160                                    8 Claims

ABSTRACT OF THE DISCLOSURE

An apparatus for automatically loading rows of containers into a collecting receiver comprising a vertically movable discharger having a stable ground plate and a spring mounted cover plate to hold the containers. A device is provided for the stepwise advance of the collecting receiver located below the discharger and stops are provided on a controller cylinder which arrest the movement of the receiver in predetermined loading positions by one row of containers for each movement.

---

The present invention relates to an apparatus for loading rows of rectangular or square bags or containers into a collecting receiver, outer cardboard box, or the like in a fully automatic manner. So far no suitable packaging device is known for square containers of soft material consisting of paper reinforced with plastics material, unless the container is provided with some type of projecting corner or welding seam. With those packaging devices already known the containers are lifted and transported at the projecting end lobes or welding seams, whereby it is of course possible for the containers or welding seams to become damaged. It is the object of the present invention to produce an apparatus which makes it possible to load rows of containers in a fully automatic manner, while handling the containers with utmost care.

According to the present invention the apparatus is essentially characterized by a vertically movable discharger or head of grab consisting of a stable ground plate and a spring mounted cover plate to hold the containers, and by a device for the stepwise advance of the collecting receiver, or the like, for the containers, whereby the collecting receiver moves on a surface, which is located below the head of grab at an angle of approximately 45 degrees, and is arrested in the individual loading positions by means of stops, in order to advance the collecting receiver by one row of containers at each movement, whereby the moving of the head of grab for the discharge of the containers is effected by the action of springs. The head of grab necessarily has to move back into its original position, whereby a cam plate may suitably be provided to control this movement. According to the invention the collecting receivers which are to be loaded are arrested on the inclined surface by means of stops which are located on a controller cylinder and staggered on the circumference. The stops may be controlled in such a way as to load the collecting receiver with either one or several rows of containers.

Figure 1:
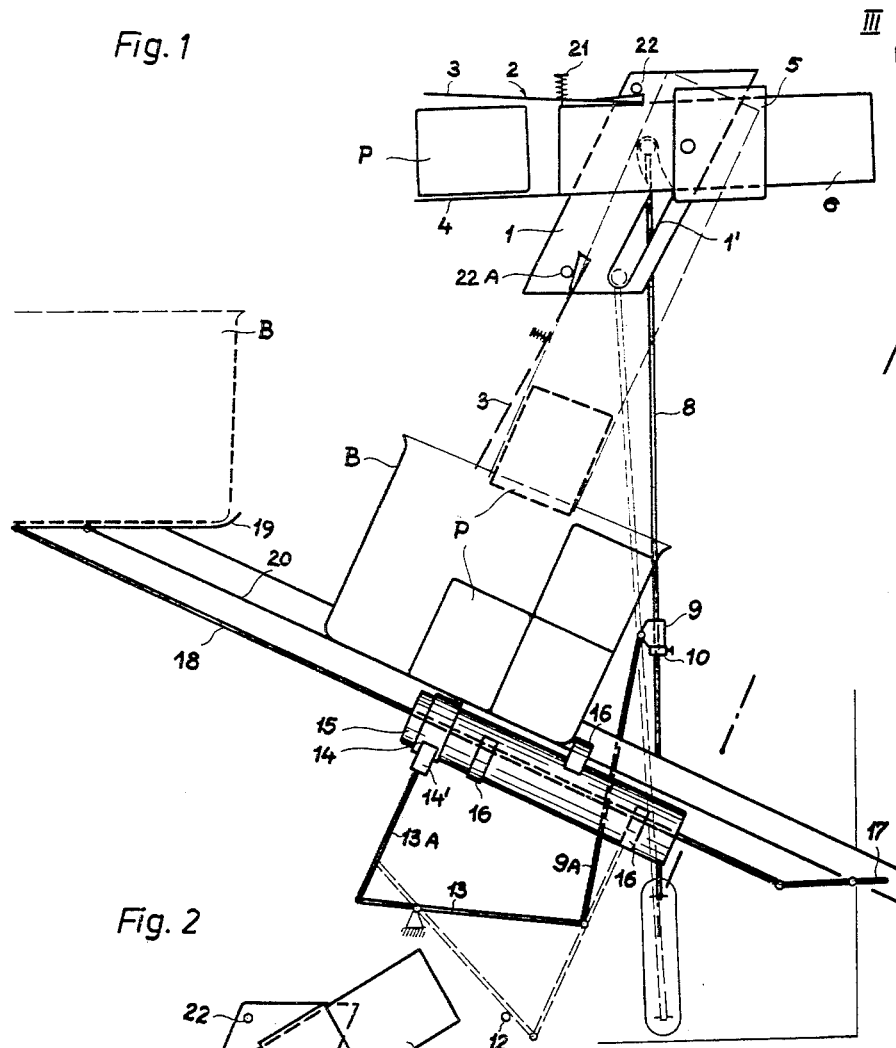
Figure 2:
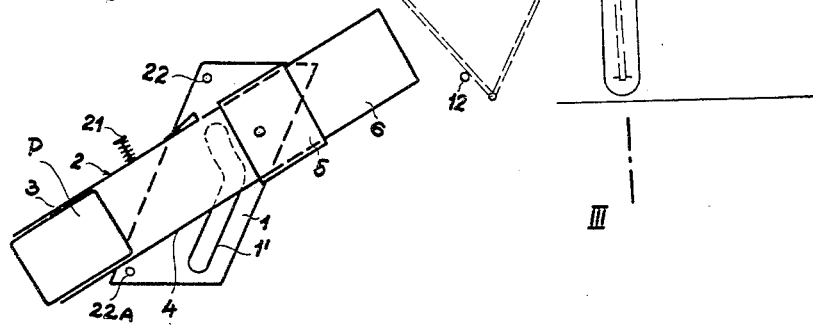

In the drawings an embodiment of the invention is shown by way of example. FIGURE 1 shows a lateral and partly sectional view of the apparatus and the packaging device; FIGURE 2 shows a detail of FIGURE 1, whereby the discharger or head of grab is in an intermediate position; FIGURE 3 shows a sectional view along line III—III of FIGURE 1, and FIGURE 4 is a top view of the discharger or head of grab.

The apparatus consists mainly of two parts, namely the discharger or head of grab 2 and the advance device for collecting receiver B. A stable ground plate 4 and—opposite to it—a cover plate 3 which is mounted on a compression spring by means of a pin 21 are attached to the head of grab 2. Trip dog 22 secures an open state for cover plate 3 in its position at the top. On account of guide rails 6 the head of grab rests movably in the bearing 5 of the main bearing 7, and is guided in a slotted plate 1, whreby a connecting rod 8 leads into the guiding slot 1' and is connected with lever 11 (FIGURE 3).

Furthermore, the connecting rod 8 is provided with a case 9 which can be adjusted by a set collar 10 and which is connected with connecting rod 13A by means of the levers 9A and 13 respectively, whereby the connecting rod 13A moves pawl 14' of ratchet 14, which both rest on cylinder 15 which is provided with stops 16 which are staggered on the circumference or arranged in a spiral, and serve to support and arrest the collecting receiver B which stands on the inclined surface 20. The inclined surface has guide rails which can be adjusted inwardly and outwardly according to the width of the collecting receiver. A stop surface or resting plate 17 is provided at the end of the inclined surface (FIGURE 1), which is moved when the fully loaded collecting receiver B pushes against it, and which also moves a tilting lever 19 by means of a lever mechanism 18, whereby the tilting lever admits the following empty collecting receiver, which is indicated by dotted lines in FIGURE 1, to the inclined surface.

The operation of this apparatus is as follows:

From the filling machine the containers P are brought to the head of grab 2 by means of a feeding device and put onto the stable ground plate 4. As soon as the number of containers to be lifted by the head of grab 2 is obtained a pawl release 25 is operated by means of a control switch (magnetic or pneumatic) which is not shown in the drawings, whereby the pawl 24 is released, which is attached to the head of grab 2, so that the head of grab 2, under the tension of a spring 31 (FIGURE 3) which becomes effective at lever 32 which in turn is connected with lever 11 by means of a connecting rod 33, and through the guidance of the guilding slot which is provided in the slotted plate, is moved first in a circular arch and then in a straight line into that position which is indicated in FIGURE 1 by dotted lines. When transporting or discharging the containers the spring mounted cover plate 3 is pressed against the containers by means of a compression spring which rests on a pin 21, whereby the trip dog 22 has been previously disengaged by the cover plate, ensuring thus that the containers are accurately held by the head of grab, and that full account is taken of their shape. When reaching the position at the bottom, which is indicated in FIGURE 1 by dotted lines, the spring mounted cover plate 3 is opened by means of a trip dog 22A and the containers are discharged into the collecting receiver B. On account of the circular movement and the adjoining straight movement of the head of grab the container is guided on both sides until shortly before the cover plate 3 opens, securing thus exact inserting into the collecting receiver.

The upward movement of the head of grab into the original position is either necessarily effected through lever 11 by means of the cam plate 11' or in another way, e.g. by means of a separate drive. The head of grab is secured in its original position by the pawl 24, which is attached to it, and operated by the pawl release 25. During the upward movement of the head of grab the connecting rod 8 picks up the case 9 which has been adjusted by the set collar 10, advancing thus the controller cylinder 15 by means of the pawl 14' which is put into operation through lever mechanism 9A, bent lever 13, and connecting rod 13. When advancing the controller cylinder 15 by one tooth of the ratchet 14, stop 16 still remains effective in arresting the collecting receiver, and in spite of being moved slightly it continues to support the collecting receiver B so that another layer can be loaded. During a further advance this stop will move beyond the range of the collecting receiver while the following stop becomes effective so that the collecting receiver can slide down to it along the inclined surface 20. Thus it is possible to admit either two or several layers of containers or to provide for one layer of containers during each discharge of the head of grab by regulating it accordingly. Stop 12 controls pawl 14' in order to advance the controller cylinder 15 either by one or two teeth.

After having been loaded the collecting receiver is released by the last stop 16 and reaches plate 17 which releases the next collecting receiver by means of the lever mechanism 18, admitting it to the inclined surface 20, whereby the collecting receiver is again arrested by the first stop 16, and the loading process is then repeated.

I claim:
1. An apparatus for automatically loading rows of containers into a collecting receiver, comprising
   a vertically movable discharger having a stable ground plate and a spring mounted cover plate to hold the containers,
   means for advancing stepwise the collecting receiver to loading positions below the movable discharger,
   stop means for arresting said collecting receiver in said loading positions and for permitting the advancing of the collecting receiver by one row of containers at each movement,
   spring means for moving said movable discharger for discharging the containers, and
   a cam plate means for controlling the upward movement of said movable discharger.

2. The apparatus, as set forth in claim 1, further comprising
   a spring operated slotted plate defining a guiding slot for moving said movable discharger in a circular movement which is followed by a linear movement in the downward direction, and
   a trip dog means for slightly lifting said cover plate while in a final position at the bottom thereby releasing said containers.

3. The apparatus, as set forth in claim 1, further comprising
   a tracer means for disengaging the movable discharger after a predetermined number of containers has been admitted, and
   said movable discharger holding the containers during movement thereof by said spring mounted cover plate.

4. The apparatus, as set forth in claim 1, further comprising
   a controller cylinder including stops staggered on the circumference thereof, and
   said stops successively serving as supports for the collecting receiver to be loaded.

5. The apparatus, as set forth in claim 4, wherein
   said controller cylinder defines recesses,
   means for effecting an upward movement of the movable discharger, and
   a reversible pawl gearing into said recesses of said controller cylinder causing the controller cylinder to turn, advancing thereby the collecting receiver, when at least partially loaded by one step.

6. The apparatus, as set forth in claim 4, further comprising
   a spring supporting said controller cylinder so that the impact of the collecting receiver on said stop will shove together those containers already in said collecting receiver, whereby even the last row of containers may be inserted.

7. The apparatus, as set forth in claim 4, further comprising
   an inclined surface for moving said collecting receiver therealong,
   a movable resting plate disposed on said inclined surface and located beyond said controller cylinder, and
   a tilting lever means connected to said inclined surface for arresting and releasing a subsequent empty collecting receiver when a loaded collecting receiver actuates said resting plate whereby said subsequent empty collecting receiver slides onto said inclined surface and to a subsequent stop of said controller cylinder.

8. The apparatus, as set forth in claim 7, wherein
   said inclined surface is provided with guide rails on both sides adapted for adjustment to accommodate the width of the inclined surface to the size of the collecting receiver.

References Cited

UNITED STATES PATENTS

| 2,844,926 | 7/1958 | Mattos | 53—160 |
| 2,939,256 | 6/1960 | Nigrelli | 53—247 X |
| 3,097,460 | 7/1963 | O'Brien | 53—244 X |
| 3,332,200 | 7/1967 | Englander | 53—160 X |

FOREIGN PATENTS 135,018  12/1959  U.S.S.R.

WAYNE A. MORSE, Jr., Primary Examiner

U.S. Cl. X.R.

53—164, 244, 247, 250